United States Patent
Wermuth et al.

(10) Patent No.: US 8,099,230 B2
(45) Date of Patent: Jan. 17, 2012

(54) METHOD TO ENCHANCE LIGHT LOAD HCCI COMBUSTION CONTROL USING MEASUREMENT OF CYLINDER PRESSURES

(75) Inventors: Nicole Wermuth, Ann Arbor, MI (US); Tang-Wei Kuo, Troy, MI (US); Paul M. Najt, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 514 days.

(21) Appl. No.: 12/338,028

(22) Filed: Dec. 18, 2008

(65) Prior Publication Data

US 2009/0164104 A1 Jun. 25, 2009

Related U.S. Application Data

(60) Provisional application No. 61/014,569, filed on Dec. 18, 2007.

(51) Int. Cl.
*F02M 7/28* (2006.01)
*F02D 41/24* (2006.01)
(52) U.S. Cl. ........................ 701/111; 123/435
(58) Field of Classification Search .......... 701/103–105, 701/110, 111; 123/435
See application file for complete search history.

(56) References Cited

U.S. PATENT DOCUMENTS

| | | | |
|---|---|---|---|
| 6,971,365 B1 | 12/2005 | Najt et al. | |
| 6,994,072 B2 | 2/2006 | Kuo et al. | |
| 7,059,281 B2 | 6/2006 | Kuo et al. | |
| 7,128,047 B2 | 10/2006 | Kuo et al. | |
| 7,346,446 B2 | 3/2008 | Kang et al. | |
| 7,418,336 B2 * | 8/2008 | Matekunas et al. | 701/103 |
| 7,739,999 B2 * | 6/2010 | Kang et al. | 123/299 |
| 7,742,868 B2 * | 6/2010 | Kang et al. | 701/105 |
| 7,894,976 B2 * | 2/2011 | Yun et al. | 701/110 |
| 2008/0243356 A1 | 10/2008 | Kang et al. | |
| 2008/0283006 A1 | 11/2008 | Sutherland et al. | |
| 2009/0272363 A1 * | 11/2009 | Yun et al. | 123/295 |

FOREIGN PATENT DOCUMENTS

| | | |
|---|---|---|
| EP | 1744037 A1 | 1/2007 |
| EP | 1905989 A2 | 4/2008 |
| WO | WO-2007044331 A2 | 4/2007 |
| WO | WO-2008134169 A1 | 11/2008 |
| WO | WO-2008134170 A1 | 11/2008 |

* cited by examiner

*Primary Examiner* — Hai Huynh

(57) ABSTRACT

A method for controlling an amount of fuel reforming in an internal combustion engine configured to selectively operate in a homogeneous charge compression-ignition combustion mode with an exhaust recompression strategy includes monitoring in-cylinder pressures during a current combustion cycle, utilizing the monitored in-cylinder pressures to project reforming required in a next combustion cycle, and controlling the next combustion cycle based on the projected reforming required in the next combustion cycle.

13 Claims, 8 Drawing Sheets

METHOD TO ENCHANCE LIGHT LOAD HCCI COMBUSTION CONTROL USING MEASUREMENT OF CYLINDER PRESSURES

TECHNICAL FIELD

This invention relates to operation and control of homogeneous-charge compression-ignition (HCCI) engines.

BACKGROUND

In a homogeneous charge compression ignition ('HCCI') engine, combustion of a cylinder charge occurs spontaneously throughout the entire combustion chamber volume. The homogeneously mixed cylinder charge is auto-ignited as the cylinder charge is compressed and its temperature increases.

The combustion process in an HCCI engine depends strongly on factors such as cylinder charge composition, temperature, and pressure at the intake valve closing. Hence, the control inputs to the engine, for example, fuel mass and injection timing and intake/exhaust valve profile, must be carefully coordinated to ensure robust auto-ignition combustion. Generally speaking, for best fuel economy, an HCCI engine operates unthrottled and with a lean air-fuel mixture. Further, in an HCCI engine using exhaust recompression valve strategy, the cylinder charge temperature is controlled by trapping different amount of the hot residual gas from the previous cycle by varying the exhaust valve close timing. The opening timing of the intake valve is delayed from normal to a later time preferably symmetrical to the exhaust valve closing timing about top-dead-center (TDC) intake. Both the cylinder charge composition and temperature are strongly affected by the exhaust valve closing timing. In particular, more hot residual gas from a previous cycle can be retained with earlier closing of the exhaust valve which leaves less room for incoming fresh air mass. The net effects are higher cylinder charge temperature and lower cylinder oxygen concentration. In the exhaust recompression strategy, the exhaust valve closing timing (thereby, the intake valve opening timing) is typically quantified by valve overlap which is a negative number, and the Negative Valve Overlap (NVO) is defined as the duration in crank angle between exhaust valve closing and intake valve opening.

In addition to a valve control strategy, there must be a suitable fuel injection strategy for stable combustion. For example, at a low fueling rate (for example, fueling rate<7 mg/cycle at 1000 rpm), the cylinder charge may not be hot enough for a stable auto-ignited combustion in spite of the highest value of NVO allowed, leading to a partial-burn or misfire. One way to increase the charge temperature is to pre-inject a small amount of fuel when a piston approaches intake top-dead-center (TDC) during the recompression. A portion of the pre-injected fuel reforms due to high pressure and temperature during the recompression, and releases heat energy, increasing the cylinder charge temperature enough for successful auto-ignited combustion of the combustion charge resulting from the main fuel injection. The amount of auto-thermal fuel reforming is based upon the pre-injection mass and timing, typically with fuel reforming increasing with earlier pre-injection timing and greater pre-injection fuel mass.

It is important to precisely control the amount of fuel reforming because excessive fuel reforming decreases the overall fuel economy, and lack of fuel reforming may result in combustion instability. With even lower engine load (and therefore lower temperature in the cylinder) reforming of a portion of the fuel during recompression may not be enough to trigger auto-ignition. In this operating range (near idle operation) the main part of the fuel mass is injected late in the main compression rather than during intake. The stratified part of the fuel is ignited by a spark and compresses the remaining fuel-air mixture further to reach auto-ignition. The amount of injected fuel that can be reformed is governed by recompression temperature, pressure, and oxygen availability which depend strongly on engine operation of previous cycle. Thus, better or more robust low load HCCI combustion could be realized if the amount of fuel reforming from cycle to cycle is closely monitored and controlled. Precise fuel reforming control improves combustion performance because excessive reforming decreases fuel economy whereas lack of fuel reforming may result in combustion instability.

Effective control of the reforming process requires accurate estimation of the degree of reforming. A method is known that estimates the amount of fuel reforming using the unique characteristic of UEGO (Universal Exhaust Gas Oxygen) sensor. A control strategy is also known to indirectly control the amount of fuel reforming in an HCCI engine by monitoring engine operating conditions including intake mass air flow and exhaust air/fuel ratio, controlling negative valve overlap to control intake airflow to achieve a desired actual air-fuel ratio for a given fueling rate, and adjusting timing of pre-injection of fuel to control the measured air-fuel ratio to a desired second air/fuel ratio smaller than the desired actual air-fuel ratio. However, conditions within the combustion chamber necessary for proper reforming can vary from combustion cycle to combustion cycle, and known methods to estimate reforming are either overly computer intensive or estimate reforming requirements based on historical data.

SUMMARY

An internal combustion engine is configured to selectively operate in a homogeneous charge compression-ignition combustion mode with an exhaust recompression strategy. A method for controlling an amount of fuel reforming in the engine includes monitoring in-cylinder pressures during a current combustion cycle, utilizing monitored in-cylinder pressures to project reforming required in a next combustion cycle, and controlling the next combustion cycle based on the projected reforming required in the next combustion cycle.

BRIEF DESCRIPTION OF THE DRAWINGS

One or more embodiments will now be described, by way of example, with reference to the accompanying drawings, in which.

DETAILED DESCRIPTION

Figure 1:
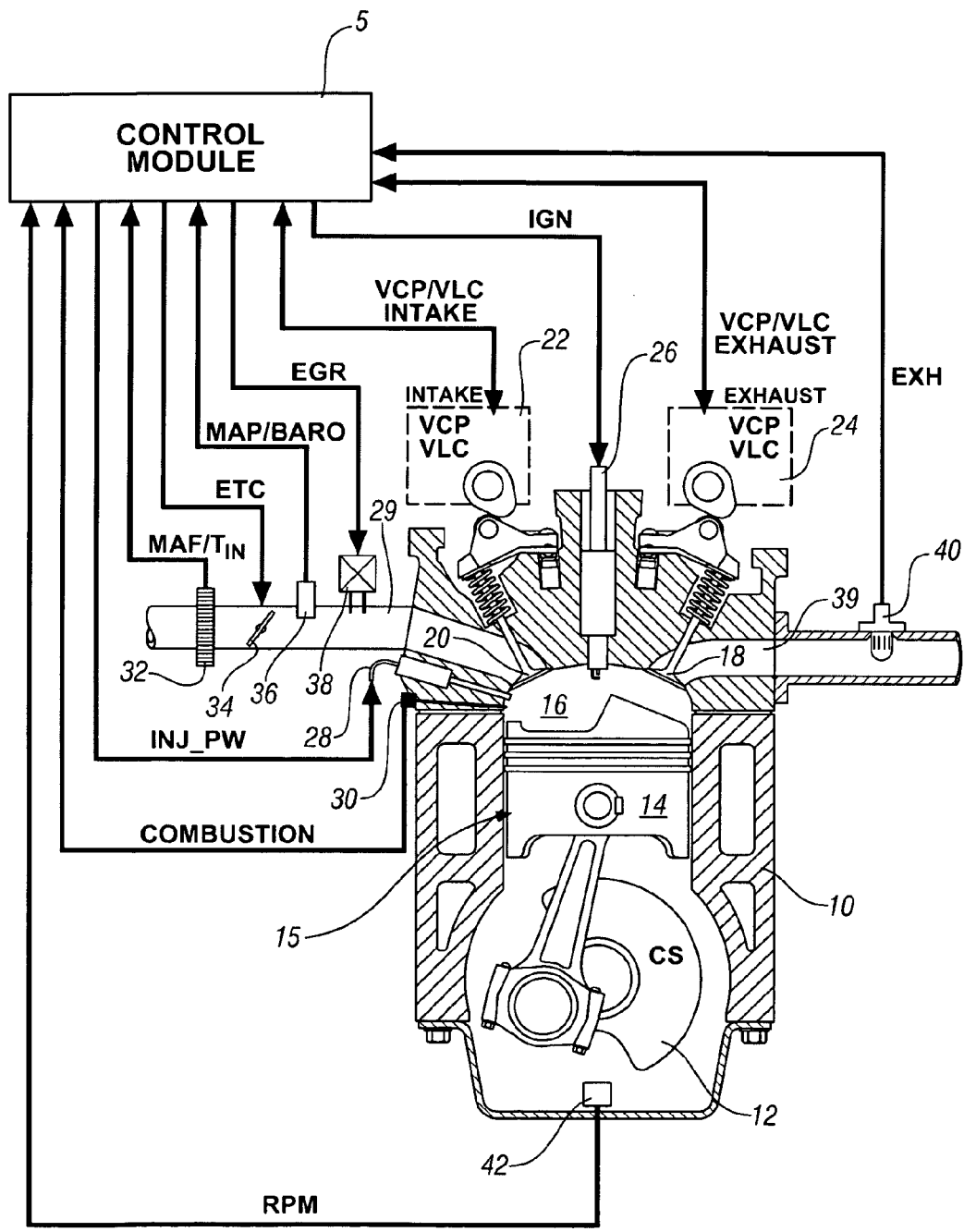
FIG. 1 is a schematic drawing of an engine system, in accordance with the present disclosure.

Referring now to the drawings, wherein the showings are for the purpose of illustrating certain exemplary embodiments only and not for the purpose of limiting the same, FIG. 1 schematically illustrates an exemplary internal combustion engine 10 and accompanying control module 5 (control module) that have been constructed in accordance with an embodiment of the disclosure. The engine 10 is selectively operative in a controlled auto-ignition mode and a spark-ignition mode. The engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating piston travel is translated to rotational motion. A single one of the cylinders 15 is shown in FIG. 1.

An air intake system channels intake air to an intake manifold 29 which directs and distributes the air into an intake passage to each combustion chamber 16. The air intake system comprises air flow ductwork and devices for monitoring and controlling the air flow. The devices preferably include a mass air flow sensor 32 for monitoring mass air flow and intake air temperature. A throttle valve 34, preferably comprising an electronically controlled device controls air flow to the engine 10 in response to a control signal (ETC) from the control module 5. A pressure sensor 36 is adapted to monitor manifold absolute pressure in the intake manifold 29. An external flow passage (not shown) recirculates exhaust gases from an exhaust manifold 39 to the intake manifold 29, controlled by an exhaust gas recirculation (EGR) control valve 38. The control module 5 controls mass flow of exhaust gas to the engine air intake by controlling opening of the EGR control valve 38.

One or more intake valve(s) 20 control air flow from the intake passage into the combustion chamber 16. One or more exhaust valve(s) 18 control exhaust flow out of the combustion chamber 16 to the exhaust manifold 39. Openings and closings of the intake and exhaust valves 20 and 18 are preferably controlled with a dual camshaft (as depicted), the rotations of which are linked and indexed with rotation of the crankshaft 12. Device 22 preferably comprises a controllable mechanism operative to variably control valve lift (VLC) and variably control cam phasing (VCP) of the intake valve(s) 20 for each cylinder 15 in response to a control signal (INTAKE) from the control module 5. Device 24 preferably comprises a controllable mechanism operative to variably control valve lift and variably control cam phasing of the exhaust valve(s) 18 for each cylinder 15 in response to a control signal (EXHAUST) from the control module 5. Devices 22 and 24 each preferably comprises a controllable two-step valve lift mechanism operative to control magnitude of valve lift, or opening, to one of two discrete steps, e.g., a low-lift valve open position (about 4-6 mm) for load speed, low load operation, and a high-lift valve open position (about 8-10 mm) for high speed and high load operation. Devices 22 and 24 comprise variable cam phasing mechanisms to control phasing (i.e., relative timing) of opening and closing of the intake valve(s) 20 and the exhaust valve(s) 18 respectively. The variable cam phasing mechanisms shift valve opening time relative to positions of the crankshaft 12 and piston 14, referred to as phasing. The preferred VCP system may have a range of phasing authority of 60°-90° of crank rotation, thus permitting the control module 5 to advance or retard opening and closing of one of the intake valves 20 and the exhaust valves 18 relative to position of the piston 14. The range of phasing authority is defined and limited by the devices 22 and 24. Devices 22 and 24 include camshaft position sensors (not shown) to determine rotational positions of the intake and the exhaust camshafts (not shown). Devices 22 and 24 are actuated using one of electro-hydraulic, hydraulic, and electric control force, controlled by the control module 5. Devices 22 and 24 and the intake exhaust valve(s) 18 and 20 are elements included in a controllable engine valve system.

Devices 22 and 24 can be controlled to achieve a negative valve overlap period by controlling phasings and/or lift magnitudes for either one or both of the intake and exhaust valves 20 and 18. The negative valve overlap period is achieved by advancing the phasing of the exhaust valve 18 and correspondingly retarding phasing of the intake valve 20. The negative valve overlap period is created at the end of the exhaust stroke and the beginning of the ensuing intake stroke during which both the intake valve 20 and the exhaust valve 18 for the cylinder 15 are closed. Fuel is pre-injected into the combustion chamber 16 for reforming during each negative valve overlap period. The portion of the pre-injected fuel that is reformed is controllable by adjusting timing and mass of the pre-injection fueling. Fuel reforming can be increased by advancing the crank angle timing of the pre-injection fueling, and/or by increasing the mass of the pre-injection fueling. Similarly, fuel reforming can be decreased by retarding the crank angle timing of the pre-injection fueling, and/or by decreasing the mass of the pre-injection fueling.

A fuel injection system comprises a plurality of high-pressure fuel injectors 28 to directly inject a mass of fuel into each of the combustion chamber 16 in response to one or more control signals (INJ_PW) from the control module 5. The fuel injectors 28 are supplied pressurized fuel from a fuel distribution system (not shown). Fuel can be injected during a single fueling event for each cylinder 15 for each combustion cycle. During operation in the controlled auto-ignition mode there can be multiple fueling events for each cylinder 15 for each combustion cycle, including pre-injection fueling during a negative valve overlap period of the combustion cycle, and a main fueling preferably initiated during the compression stroke. The control signal(s) from the control module 5 consist of the crank angle timing for start of fuel injection and the duration of the injection pulsewidth. The timing for start of each fuel injection event is defined in terms of the crank angle defining the position of the piston 14 in the cylinder 15, and the pulsewidth duration is defined to inject a predetermined fuel mass from the fuel injector 28 into the cylinder 15.

A spark ignition system provides spark energy to a spark plug 26 for igniting or assisting in igniting cylinder charges in each combustion chamber 16, in response to a control signal (IGN) from the control module 5. The spark plug 26 enhances control of combustion phasing in each cylinder 15 of the engine 10 at certain conditions, e.g., during cold start and near a low load operation limit.

Sensing devices monitor engine operation, including a crank sensor 42 operative to monitor crankshaft rotational position, i.e., crank angle and speed, a wide range air/fuel ratio sensor 40 adapted to monitor air/fuel ratio in the exhaust gas feedstream, and a combustion sensor 30 adapted to monitor in-cylinder combustion in real-time, during ongoing operation of the engine 10. The combustion sensor 30 comprises a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines the combustion phasing, i.e., timing of combustion pressure relative to the crank angle of the crankshaft 12 and position of the piston 14 for each cylinder 15 for each combustion cycle. The combustion sensor 30 can also be monitored by the control module 5 to determine a mean-effective-pressure (IMEP) for each cylinder 15 for each combustion cycle. Alternatively, other sensing systems can be used to monitor real-time in-cylinder combustion parameters which can be translated into combustion phasing, e.g., ion-sense ignition systems and non-intrusive cylinder pressure monitoring systems.

During operation in the controlled auto-ignition combustion mode, the engine 10 operates un-throttled on gasoline or similar fuel blends over an extended range of engine speeds and loads. The engine 10 operates in the spark ignition combustion mode with a controlled throttle operation under conditions not conducive to the controlled auto-ignition combustion mode operation, and to achieve engine power to meet an operator torque request. Widely available grades of gasoline and light ethanol blends thereof are preferred fuels; however, alternative liquid and gaseous fuels such as higher ethanol blends (I E80, E85), neat ethanol (E99), neat methanol (M100), natural gas, hydrogen, biogas, various reformates, syngases, and others may be used in the implementation of the present disclosure.

The control module 5 preferably comprises a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital conversion circuitry and digital to analog circuitry, and input/output circuitry and devices, and appropriate signal conditioning and buffer circuitry. The control module 5 has a set of control algorithms, comprising resident program instructions and calibrations stored in the non-volatile memory and executed to provide the respective functions of each computer. The algorithms are executed during preset loop cycles such that each algorithm is executed at least once each loop cycle. Algorithms are executed by the central processing unit to monitor inputs from the aforementioned sensing devices and execute control and diagnostic routines to control operation of the actuators, using preset calibrations. Loop cycles are executed at regular intervals, for example each 3.125, 6.25, 12.5, 25 and 100 milliseconds during ongoing engine and vehicle operation. Alternatively, algorithms may be executed in response to occurrence of an event.

The control module 5 executes algorithmic code stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift, on systems so equipped. The control module is adapted to receive input signals from the operator (e.g., a throttle pedal position and a brake pedal position) to determine the operator torque request (To_req) and from the sensors indicating the engine speed (RPM) and intake air temperature (Tin), and coolant temperature and other ambient conditions.

Figure 2:
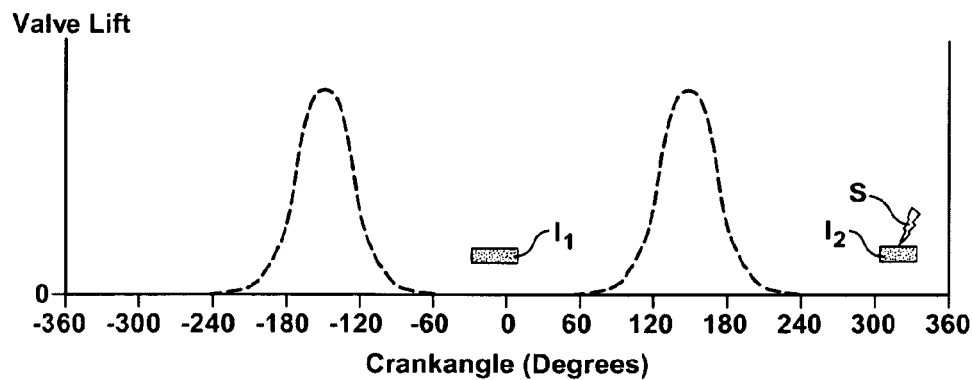
FIG. 2 is a graph representing operation of a known homogeneous charge compression ignition engine, in accordance with the present disclosure.

FIG. 2 is a graphical illustration of an engine operating in HCCI mode under engine idle and low temperature, lean operation in accordance with the present disclosure. The particular engine operation depicted is a spark-assisted HCCI mode or a spark-assist mode, preferably using low lift cams with split injection. The total fuel charge to be injected is split into two injection events, a first injection and a second injection. Known HCCI combustion, as mentioned above, occurs without a spark by compressing the fuel air mixture to a point of auto-ignition. However, this chart demonstrates an additional known strategy whereby a spark plug, glow plug, or other source of ignition is utilized to assist combustion in cases where cylinder conditions are too cold to support stable auto-ignition.

As described above, spark-assisted HCCI is a combustion method wherein a spark is utilized to induce combustion. According to a particular embodiment of spark-assisted HCCI, a spark is utilized to produce ignition and a resulting flame front within the combustion chamber. This flame front produces increased pressure, and therefore increased energy, within the combustion chamber. As described above, HCCI operation is difficult or unstable at low engine speeds and loads due to low temperatures or a lack of sufficient heat energy within the combustion chamber. This embodiment, known as flame-induced compression ignition, increases energy present within the combustion chamber, thereby facilitating compression ignition in front of the wave front and increasing resulting stability of HCCI operation. However, the ignition and resulting flame front produce localized higher temperatures within the combustion chamber, higher temperatures than are produced in equivalent non-spark-assisted compression ignition. One having ordinary skill in the art will appreciate that higher engine out NOx emissions correspond to high temperatures within the combustion chamber. Despite low average temperatures within the combustion chamber, high localized temperatures associated with spark-assisted combustion can still produce elevated NOx emissions.

An alternative method to facilitate HCCI combustion at low engine speeds and loads, as described above, includes utilizing split injection and negative valve overlap to inject and reform fuel during a recompression period. Reforming in this way releases heat energy from the reformed fuel into the combustion chamber, thereby increasing energy available in the combustion chamber for the next main combustion event. Because resulting combustion is non-spark-assisted HCCI, localized temperatures remain low in comparison to a spark-assisted flame front and NOx production associated with reforming is typically lower as compared to an equivalent spark-assisted event. However, stability of a non-spark assisted HCCI combustion event is typically lower than stability of a spark-assisted HCCI combustion event. Further, reforming of fuel to facilitate HCCI combustion must be carefully managed, as too little reforming results in instable combustion and too much reforming results in reduced fuel efficiency through wasted fuel. Further, it will be appreciated that spark-assisted HCCI combustion and non-spark assisted HCCI combustion facilitated by reforming can be used complimentarily, with reforming being utilized in some portion of or all combustion cycles, and spark-assisted HCCI combustion being used to alternate or augment the effects of reforming as needed.

Figure 3:
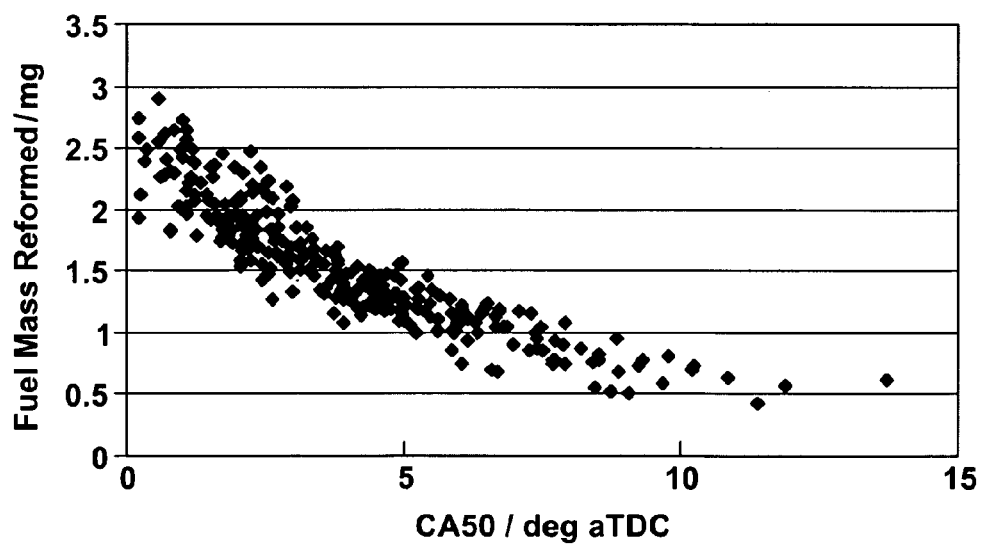
FIG. 3 is a graph illustrating a relationship between combustion phasing and fuel mass burned during reforming, in accordance with the present disclosure.
Figure 4:
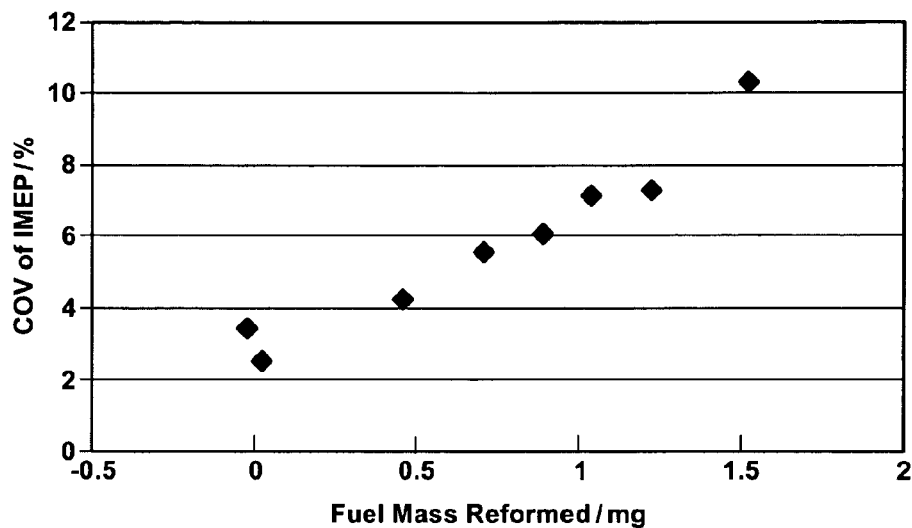
FIG. 4 is a graph illustrating a relationship between fuel mass burned during reforming and COV of IMEP, in accordance with the present disclosure.

The present disclosure relates to a method for the estimation and control of the amount of fuel reforming during the recompression period to further extend the low load operating limit of controlled auto-ignition combustion. FIG. 3 graphically illustrates an exemplary relationship of fuel mass reformed during recompression and combustion phasing following main combustion, in accordance with the present disclosure. Testing was performed at 3 mg/3 mg split injection, first injection EOI 395 deg bTDC. As is evident in the data, additional reforming increases energy within the combustion chamber, thereby advancing combustion phasing for the combustion cycle. FIG. 4 graphically illustrates an exemplary correlation between the fuel mass reformed and combustion stability, in accordance with the present disclosure. COV of IMEP, a direct indicator of combustion stability, is plotted against fuel mass reformed. Higher values of COV of IMEP indicate lower combustion stability. Increased reforming as utilized herein increases energy present within the combustion chamber, but reforming also increases instability in combustion due to higher dilution of the air fuel charge with exhaust and lower concentrations of air and fuel.

Figure 5:
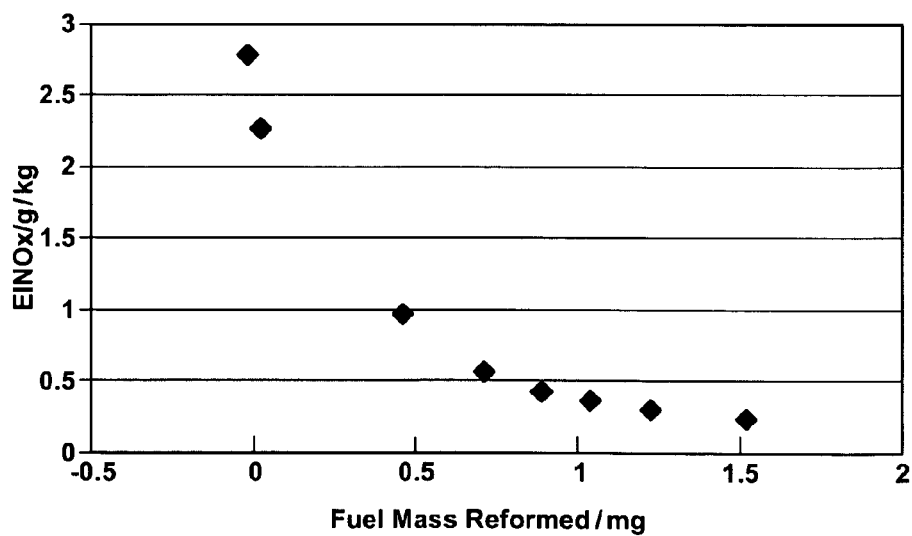
FIG. 5 is a graph illustrating a relationship between fuel mass burned during reforming and NOx emissions, in accordance with the present disclosure.
Figure 6:
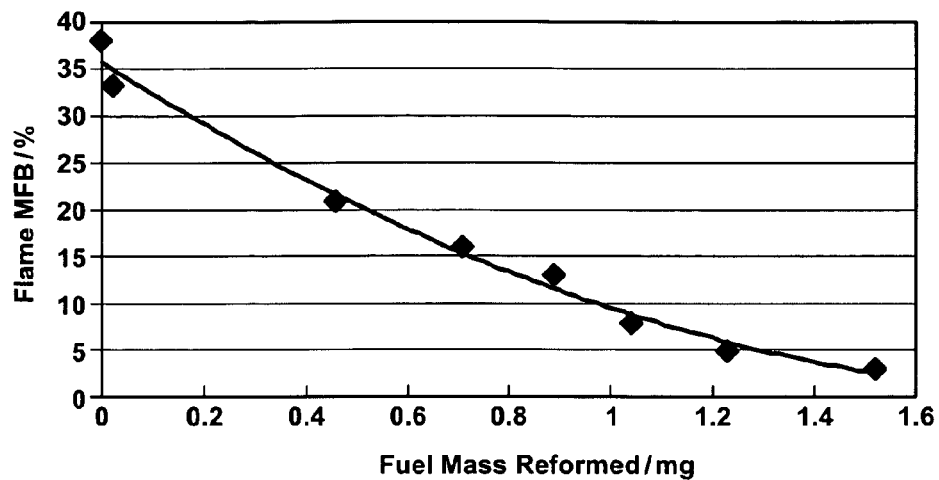
FIG. 6 is a graph illustrating a relationship between fuel mass burned during reforming and flame mass burn fraction during the following main combustion, in accordance with the present disclosure.
Figure 7:
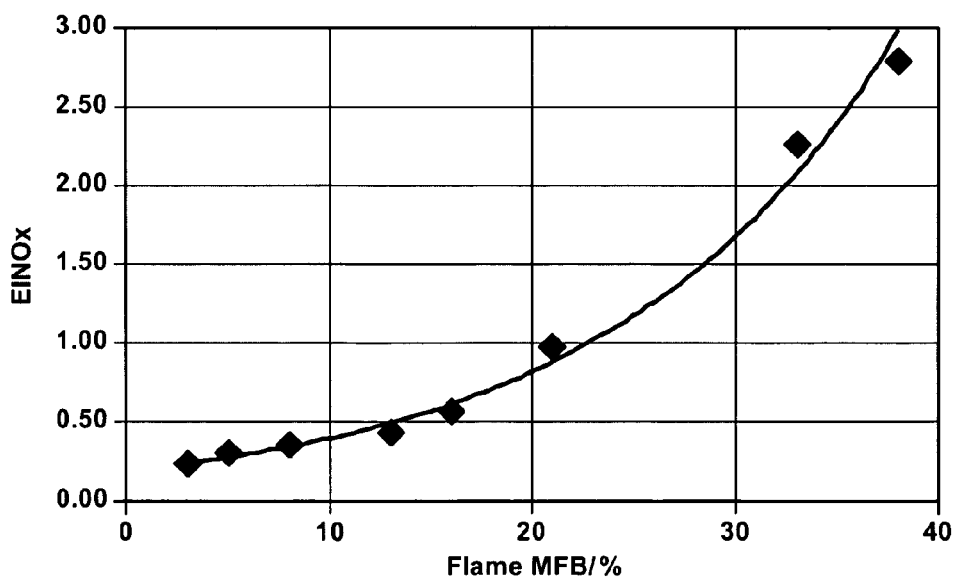
FIG. 7 is a graph illustrating a relationship between flame mass burn fraction during main combustion and NOx emissions, in accordance with the present disclosure.
Figure 8:
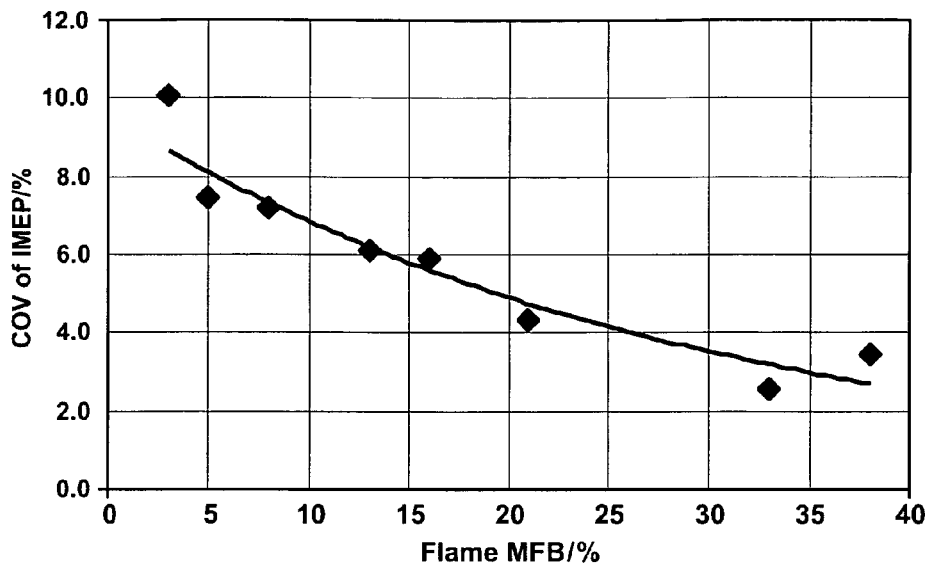
FIG. 8 is a graph illustrating a relationship between flame mass fraction burn during main combustion and COV of IMEP, in accordance with the present disclosure; (missing % on the horizontal axis)

FIG. 5 graphically illustrates an exemplary correlation between fuel mass reformed and NOx emissions, in accordance with the present disclosure. As described above, increased reforming results in less need for spark-assisted combustion to facilitate HCCI combustion, lower localized temperatures within the combustion chamber, and lower resulting NOx emissions. FIG. 6 graphically illustrates an exemplary relationship between fuel mass reformed and an equivalent spark-assisted, flame propagation combustion event, in accordance with the present disclosure. Flame mass fraction burn (MFB) describes a fraction of charge combusted by some fixed point in a combustion cycle. Applied to this disclosure, higher values of flame MFB correspond to more fuel being burned in a flame propagation mode before auto-ignition. Higher fuel mass reformed results in lower need for flame propagation through spark-assist. Data such as is depicted in FIG. 6 allows for comparison or balancing of the tradeoffs between fuel reforming in a recompression event and an equivalent flame propagation event. FIG. 7 graphically illustrates an exemplary correlation between fuel burned in the flame propagation mode before auto-ignition occurs and NOx emissions, in accordance with the present disclosure. As described above, spark-assisted HCCI combustion and the resulting flame front result in higher localized temperatures within the combustion chamber and resulting increases in engine out NOx emissions. FIG. 8 graphically illustrates an exemplary correlation between combustion stability and flame MFB, in accordance with the present disclosure. As described above, spark-assisted HCCI combustion tends to be more stable than non-spark-assisted HCCI combustion at low engine speeds and loads. This tendency is illustrated in FIG. 8, demonstrating lower COV of IMEP, indicating greater stability, with higher flame MFB values.

Figure 9:
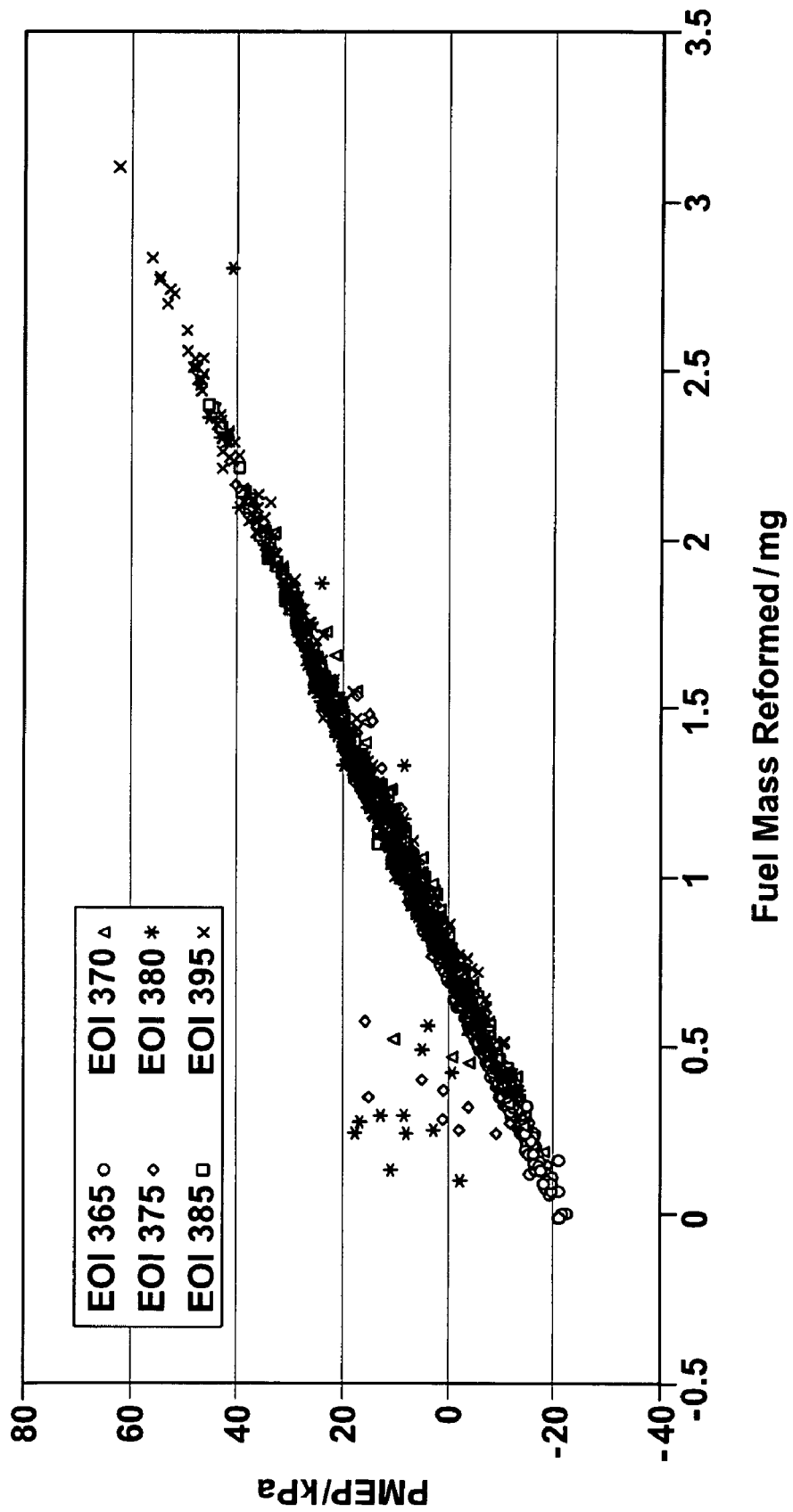
FIG. 9 is a graph illustrating a relationship between mass fuel burned during reforming and PMEP, in accordance with the present disclosure.

Tradeoff between reforming and flame burned fuel is made by considering the compromise between emissions and combustion stability. To help making the tradeoff, the amount of fuel that is reformed during recompression needs to be estimated. Analysis of test results describes a linear correlation between pumping mean effective pressure (PMEP) and the reformed fuel mass during recompression. FIG. 9 graphically illustrates an exemplary correlation between fuel mass reformed and PMEP, or pumping work, in accordance with the present disclosure. Testing was performed at 3 mg/3 mg split injection. Individual data points are illustrated through a range of first injection timings, the first injection resulting in reforming in the recompression period. As is evident in the depicted data, a predictable behavior is apparent, wherein a particular mass of fuel reforming results in a particular PMEP. Such a behavior can be utilized, wherein PMEP is a measurable or estimable value for a combustion cycle, to determine an estimated reformed fuel mass for that cycle.

Figure 10:
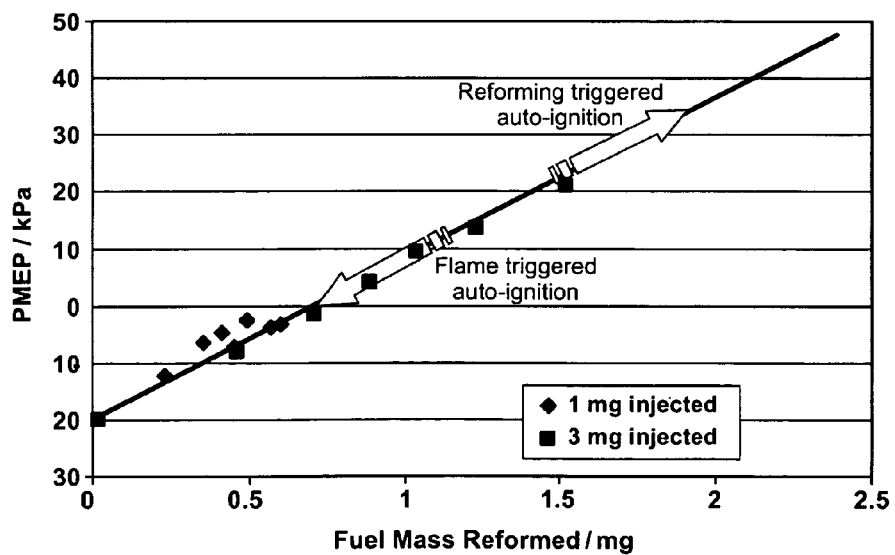
FIG. 10 is a graph illustrating a relationship between mass fuel burned during reforming and PMEP, displaying a multitude of test data points, in accordance with the present disclosure.

FIG. 10 graphically illustrates an exemplary correlation between fuel mass reformed and PMEP as an ensemble average correlation along with data points describing two different fuel injection amounts, in accordance with the present disclosure. FIG. 10 illustrates the behavior described in FIG. 9 as an average behavior, and further tests an effect of different injection amounts resulting in the given fuel mass reformed values. The exemplary data demonstrates that the correlation between fuel mass reformed and PMEP is not dependent on the amount of fuel injected during the recompression.

PMEP, or pumping work for the current cycle, can be determined from the measured cylinder pressure during the gas exchange and can be used to monitor the fuel mass burned during recompression. Because fuel mass reformed during the combustion cycle is important to understanding the tradeoff between combustion stability and emissions, measured cylinder pressure readings can therefore be utilized to modulate control of the methods utilized to extend operation of HCCI combustion at low engine speeds and loads.

Figure 11:
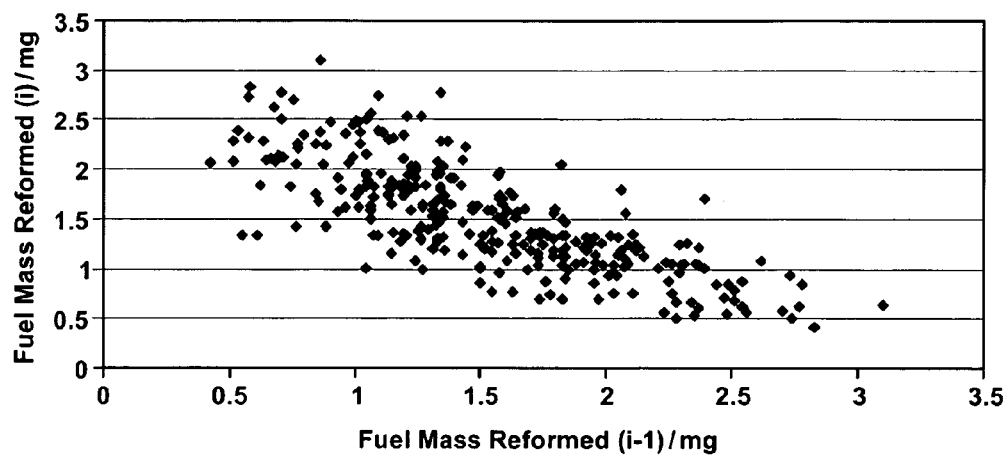
FIG. 11 is a graph illustrating a relationship between fuel mass burned during reforming in the current cycle (i) and fuel mass burned during reforming in the previous cycle (i-1), in accordance with the present disclosure.

Fuel mass reformed in a combustion cycle is important to understanding the properties of the current combustion cycle. However, the energy present within the combustion chamber and available to create compression ignition within the combustion chamber in one cycle is largely dependent upon the energy present within the combustion chamber during the last combustion cycle. Reforming required to facilitate HCCI combustion in a cycle can therefore be predicted by measuring the fuel mass reformed in the previous cycle. FIG. 11 graphically illustrates an exemplary correlation between fuel mass burned during recompression of the current cycle and fuel mass burned during recompression of the previous cycle, in accordance with the present disclosure. Testing was performed at 3 mg/3 mg split injection, first injection EOI 395 deg bTDC. By observing fuel mass reformed in one cycle, a determination can be made and utilized to control reforming in the next cycle.

Figure 12:
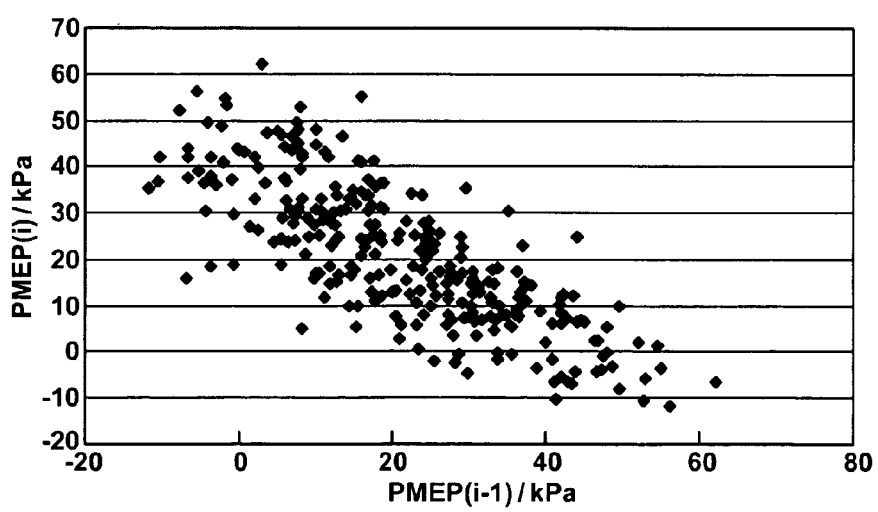
FIG. 12 is a graph illustrating a relationship between PMEP of the current cycle (i) and PMEP of the previous cycle (i-1), in accordance with the present disclosure.

As illustrated in FIG. 9, there is a strong relationship between fuel mass burned in a cycle and PMEP. FIG. 12 graphically illustrates through test data an observation of a negative relationship between PMEP for the current cycle and PMEP for the previous cycle, in accordance with the present disclosure. Testing was performed at 3 mg/3 mg split injection, first injection EOI 395 deg bTDC. One will appreciate that the data of FIG. 12 behaves closely to the data of FIG. 11. Due to the strong relationship between fuel mass reformed and PMEP, PMEP for a cycle and PMEP for the previous cycle can be used as a proxy to evaluate fuel mass reformed in a cycle and fuel mass reformed in a previous cycle.

Figure 13:
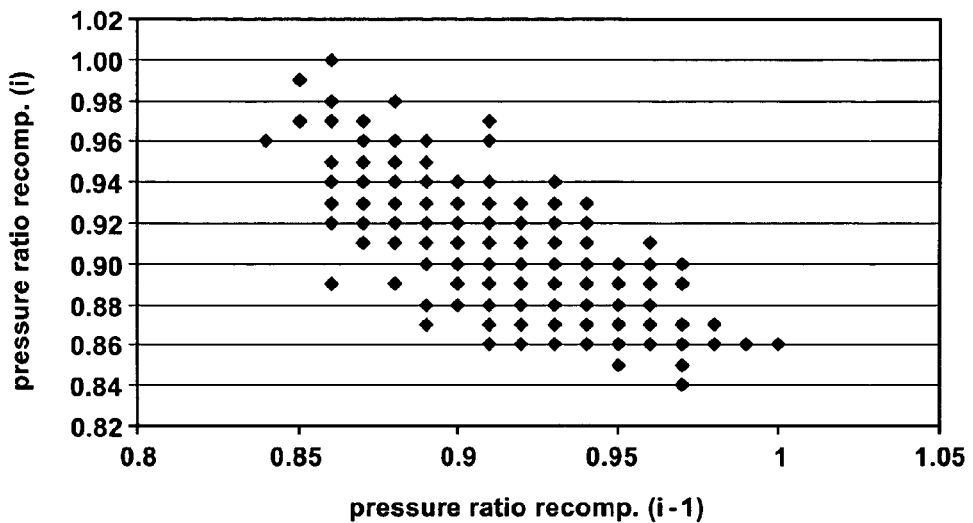
FIG. 13 is a graph illustrating a relationship between pressure ratios across recompression in the current cycle (i) and pressure ratios across recompression in the previous cycle (i-1), in accordance with the present disclosure.

PMEP from cycle to cycle can be utilized to control fuel reformation in a combustion cycle. However, one having skill in the art will appreciate that PMEP calculations can include a significant processor load. Calculating PMEP from cycle to cycle can be prohibitive or drive inaccuracy in cycle to cycle control methods. A pressure ratio describing the measured pressure at 90 CAD after TDC recompression over the measured pressure 90 CAD before TDC recompression is known in the art. Changes in pressure ratio through the recompression period are known under otherwise fixed conditions to vary proportionally with PMEP. FIG. 13 graphically depicts through test data an observation of a negative relationship between a recompression pressure ratio for the current cycle and a recompression pressure ratio for the previous cycle, in accordance with the present disclosure. Testing was performed at 3 mg/3 mg split injection, first injection EOI 400 deg bTDC. In testing similar to the testing depicted in FIGS. 11 and 12, FIG. 13 depicts correlation between the pressure ratio of a cycle and the pressure ration of the previous cycle. As fuel mass reformed or PMEP from cycle to cycle can be used to control reforming in combustion cycles, so can pressure ratios from cycle to cycle be utilized to control reforming required to support combustion cycles in HCCI combustion at low engine speeds and loads.

Figure 14:
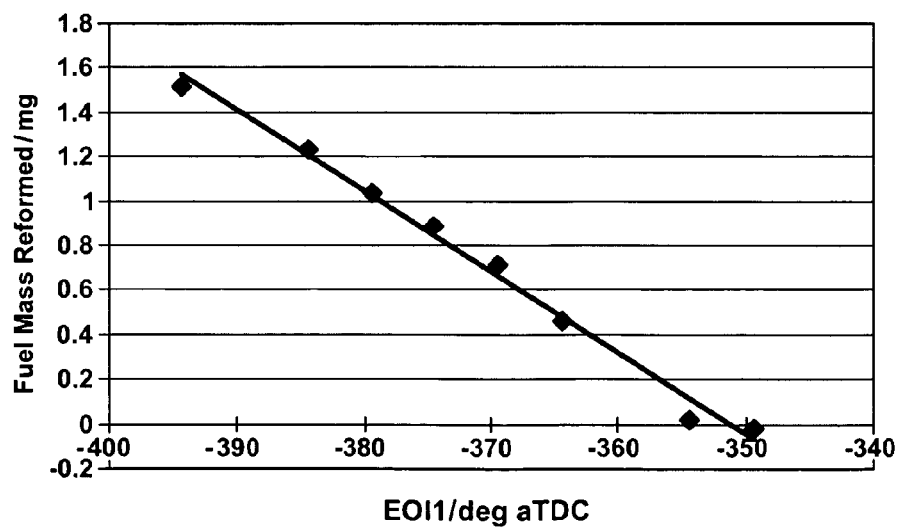
FIG. 14 is a graph illustrating a relationship between fuel mass burned during reforming and injection timing, in accordance with the present disclosure.

FIG. 14 graphically depicts an exemplary correlation between injection timing of fuel to be reformed and fuel mass reformed in the combustion cycle, in accordance with the present disclosure. As can be appreciated by an examination of FIG. 14, testing reveals a linear relationship between first pulse fuel injection timing and the amount of fuel reformed during recompression, when other injection parameters which also have an influence on the amount of fuel reforming are kept constant. Projections of fuel mass required to be reformed to facilitate HCCI combustion in the next combustion cycle, described by methods disclosed above, can be utilized to set injection timing in order to achieve a desired amount of fuel reforming for the next cycle, balancing the desired tradeoff between emissions and combustion stability. The data of FIG. 14 is exemplary for a particular engine under a set of operation conditions. It will be appreciated that the effects of fuel injection timing on fuel mass reformed will vary from engine to engine and will additionally vary for different operating conditions for a given engine. Such effects can be developed experimentally, empirically, predictively, through modeling or other techniques adequate to accurately predict engine operation, and a multitude of calibration curves might be used by the same engine for each cylinder and for different engine settings, conditions, or operating ranges. Calibration of injection timing to desired fuel mass reformed can be stored in look-up tables, programmed into a control module, or by other methods known in the art.

Figures depicted and discussed herein include ensemble average data and include engine test data gathered by engines operated under fixed test conditions. It will be appreciated by one having ordinary skill in the art that modulating test conditions can change the behavior of test results. However, the relationships described herein continue to describe behavior of expected engine operation as described by the methods discussed above. Utilization of these methods in operation requires additionally factoring in changing engine operation and conditions, and modulating predicted fuel mass reforming requirements based upon these engine operation parameters and conditions.

Understanding the aforementioned relationships enables on-board control of the reforming process based on in-cylinder pressure measurements and related calculations. A method for controlling the reforming process includes measuring in-cylinder pressures, estimating fuel mass reformed in the current cycle based on the in-cylinder pressures, utilizing the estimate of fuel mass reformed in the current cycle to project reforming required in a next cycle, and effecting control over said next cycle based on the projected needs of the next cycle. The estimation of fuel mass burned in the current cycle can be based on the relationships described above, including a direct estimation of fuel mass burned in the current cycle from PMEP in the current cycle, or an estimate based on the calculation of the pressure ratio from 90 CAD after TDC recompression over the measured pressure 90 CAD before TDC recompression. An alternative method for controlling the reforming process includes measuring in-cylinder pressures, projecting in-cylinder pressures for the next cycle based upon the methods described in FIG. 12 or 13, utilizing these pressures for the next cycle to project reforming required in a next cycle, and effecting control over said next cycle based on the projected needs of the next cycle.

In-cylinder pressures can be utilized as PMEP or pressure ratio across recompression, as described above. These measurements, utilized according to methods described herein, can be used to facilitate operation of an internal combustion engine adapted to selectively operate in a homogeneous charge compression-ignition combustion mode with an exhaust recompression strategy at low engine speeds and loads. Using correlations of a) PMEP versus fuel mass reformed and b) fuel mass reformed versus flame MFB, a PMEP value can be selected for optimal tradeoff between emissions and combustion stability at low load. Further, using correlations of current versus prior cycle PMEP or current versus prior cycle pressure ratio and injection timing versus fuel mass reformed, a control strategy is disclosed wherein the injection timing can be used to dynamically control the desired amount of fuel reforming for the next cycle hence the desired tradeoff between emissions and combustion stability.

A tradeoff between NOx emissions and combustion stability can be based upon a number of priorities. For example, reduction of NOx emissions can be given maximum priority, wherein reforming in the recompression period can be utilized fully unless combustion stability for the next cycle is projected to go below some threshold combustion stability. In another example, some level of NOx can be tolerated based upon an ability of aftertreatment devices known in the art to treat NOx. In such an example, combustion stability can be given a higher priority, and a method for balancing NOx emissions and combustion stability can be defined based upon threshold or acceptable values of combustion stability and threshold or acceptable values of NOx emissions. Alternative, such a method could implement a NOx stability tradeoff factor, utilizing equations generating a scalar value to be optimized based upon projected NOx and stability values. These methods for balancing reforming and flame propagation are examples of how this tradeoff might be performed, but the disclosure is not intended to be limited to the particular exemplary embodiments described herein.

Monitoring in-cylinder pressures can be achieved through a number of sensing devices known in the art. Directly sensing pressures within the combustion chamber is a preferred method to achieve the methods described herein as any methods using indirect computation of in-cylinder pressures would be harder to achieve usable values in real time for cycle to cycle control. Such sensing devices would preferably be directly connected to or in communication with the combustion chamber so as to directly measure pressures within the combustion chamber. Additionally or alternatively, methods could be used to estimate in-cylinder pressures in real-time, in association with dedicated computational resources, based upon other parameters that can be directly measured. Additionally or alternatively, in-cylinder pressures could be estimated in real time based upon a model of engine operation sufficient to comprehend in-cylinder conditions in real-time.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling an amount of fuel reforming in an internal combustion engine configured to selectively operate in a homogeneous charge compression-ignition combustion mode with an exhaust recompression strategy, comprising:
monitoring in-cylinder pressures during a current combustion cycle;
utilizing monitored in-cylinder pressures to project reforming required in a next combustion cycle; and
controlling the next combustion cycle based on the projected reforming required in the next combustion cycle;
wherein the monitoring in-cylinder pressures comprises monitoring a pressure ratio through a recompression period.

2. The method of claim 1, wherein utilizing monitored in-cylinder pressures to project reforming required in the next combustion cycle comprises:
projecting a pressure ratio through the recompression period for the next combustion cycle corresponding to the reforming required in the next combustion cycle based upon the pressure ratio through the recompression period in the current cycle; and
estimating the reforming required in the next combustion cycle based upon the projected pressure ratio through the recompression period for the next combustion cycle.

3. Method for controlling an amount of fuel reforming in an internal combustion engine configured to selectively operate in a homogeneous charge compression-ignition combustion mode with an exhaust recompression strategy, comprising:
monitoring in-cylinder pressures during a current combustion cycle;
utilizing monitored in-cylinder pressures to project reforming required in a next combustion cycle; and
controlling the next combustion cycle based on the projected reforming required in the next combustion cycle;
wherein monitoring in-cylinder pressures comprises monitoring a pumping mean effective pressure.

4. The method of claim 3, wherein utilizing monitored in-cylinder pressures to project reforming required in the next combustion cycle comprises:
projecting a pumping mean effective pressure for the next combustion cycle corresponding to the reforming required in the next combustion cycle based upon the pumping mean effective pressure in the current cycle; and
estimating the reforming required in the next combustion cycle based upon the pumping mean effective pressure for the next combustion cycle.

5. The method of claim 3, wherein effecting control comprises modulating an injection timing calibrated to effect said reforming required in said next combustion cycle.

6. Method for controlling an amount of fuel reforming in an internal combustion engine configured to selectively operate in a homogeneous charge compression-ignition combustion mode with an exhaust recompression strategy, comprising:
monitoring in-cylinder pressures during a current combustion cycle;
utilizing monitored in-cylinder pressures to project reforming required in a next combustion cycle; and
controlling the next combustion cycle based on the projected reforming required in the next combustion cycle;
wherein controlling the next combustion cycle based on the projected reforming required in the next combustion cycle comprises:
determining a combustion stability based upon the reforming required in the next combustion cycle;
determining a NOx emission level for an equivalent flame propagation event based upon the reforming required in the next combustion cycle; and
balancing between reforming fuel and flame propagation in the next combustion cycle based upon the combustion stability and the NOx emission level.

7. Method for facilitating operation of an internal combustion engine configured to selectively operate in a homogeneous charge compression-ignition combustion mode with an exhaust recompression strategy at low engine speeds and loads, comprising:
monitoring in-cylinder pressures;
determining a desired fuel mass to be reformed for a next combustion cycle based upon the monitored in cylinder pressures;
predicting a combustion stability based upon the desired fuel mass to be reformed;
predicting a NOx emission level for equivalent flame propagation based the desired fuel mass to be performed;
determining a stability NOx tradeoff based upon the predicted combustion stability and the predicted NOx emission level; and
balancing between reforming and flame propagation for the next combustion cycle based upon the stability NOx tradeoff.

8. The method of claim 7, wherein monitoring in-cylinder pressures comprises monitoring a pressure ratio through a recompression period.

9. The method of claim 7, wherein monitoring in-cylinder pressures comprises monitoring a pumping mean effective pressure.

10. The method of claim 7, wherein determining the stability NOx tradeoff comprises:
comparing the predicted combustion stability to a threshold combustion stability; and
limiting use of fuel reforming in the next combustion cycle if the predicted combustion stability is below the threshold combustion stability.

11. The method of claim 7, wherein determining the stability NOx tradeoff comprises:
evaluating the predicted combustion stability based upon acceptable levels of combustion stability;
evaluating the predicted NOx emission level based upon acceptable levels of NOx emissions; and
selecting use of fuel reforming and flame propagation in the next combustion cycle based upon the evaluated predicted combustion stability and the evaluated predicted NOx emission level.

12. Apparatus for controlling an amount of fuel reforming in an internal combustion engine configured to selectively operate in a homogeneous charge compression-ignition combustion mode with an exhaust recompression strategy, comprising:
a sensor monitoring in-cylinder pressures within the engine in real-time; and a control module configured to
monitor the in-cylinder pressures during a current combustion cycle,
utilizing the monitored in-cylinder pressures to project reforming required in a next combustion cycle, and
controlling the next combustion cycle based on the projected reforming required in the next combustion cycle;
wherein monitoring the in-cylinder pressures comprises determining a pressure ratio through a recompression period.

13. Apparatus for controlling an amount of fuel reforming in an internal combustion engine configured to selectively operate in a homogeneous charge compression-ignition combustion mode with an exhaust recompression strategy, comprising:

a sensor monitoring in-cylinder pressures within the engine in real-time; and
a control module configured to
monitor the in-cylinder pressures during a current combustion cycle,
utilizing the monitored in-cylinder pressures to project reforming required in a next combustion cycle, and
controlling the next combustion cycle based on the projected reforming required in the next combustion cycle;
wherein monitoring the in-cylinder pressures comprises determining a pumping mean effective pressure.

* * * * *